United States Patent [19]
Ellis et al.

[11] Patent Number: 6,048,366
[45] Date of Patent: Apr. 11, 2000

[54] SATELLITE SIMULATOR

[75] Inventors: John R. Ellis; Christopher O. Weber, both of Melbourne, Fla.

[73] Assignee: Exigent International, Inc., Melbourne, Fla.

[21] Appl. No.: 09/178,713

[22] Filed: Oct. 26, 1998

[51] Int. Cl.[7] .................................................. G06F 9/455
[52] U.S. Cl. ................................. 703/8; 703/22; 701/13
[58] Field of Search ........................ 395/500.29, 500.43; 701/13; 375/214, 224; 340/825, 825.06; 455/3.2, 13.2, 430

[56] References Cited

U.S. PATENT DOCUMENTS

| | | | |
|---|---|---|---|
| 3,887,873 | 6/1975 | Duncan et al. | 375/353 |
| 4,310,884 | 1/1982 | Roberts et al. | 395/500.34 |
| 4,641,254 | 2/1987 | Mitchell | 702/118 |
| 4,654,860 | 3/1987 | Ouimet et al. | 375/214 |
| 4,977,579 | 12/1990 | Bateman | 375/224 |
| 5,046,022 | 9/1991 | Conway et al. | 700/250 |
| 5,093,800 | 3/1992 | Ifune | 395/500.34 |
| 5,140,525 | 8/1992 | Shankar et al. | 701/226 |
| 5,398,241 | 3/1995 | Witchey | 370/391 |
| 5,485,383 | 1/1996 | Schreiber | 701/13 |
| 5,539,772 | 7/1996 | Fasulo, II et al. | 375/224 |
| 5,594,454 | 1/1997 | Devereux et al. | 342/357.09 |
| 5,610,598 | 3/1997 | Buchwitz et al. | 340/870.07 |

OTHER PUBLICATIONS

Corrie, L., Greenhut, D., Hazlehurst, R. and Walker, R., "Simulating the GPS Constellation for High Fidelity Operator Training", Position Location and Navigation Symposium, 1996, IEEE, pp. 222–229.

*Primary Examiner*—Kevin J. Teska
*Assistant Examiner*—Russell W. Frejd
*Attorney, Agent, or Firm*—Quarles & Brady LLP

[57] ABSTRACT

A satellite simulator to aid in the development and test of a spacecraft command and telemetry application for ground stations permits a satellite simulator to be implemented effectively and with less cost than has traditionally been possible with customized systems. From the spacecraft command and telemetry processing system, the present invention appears as a satellite that can provide a configurable telemetry stream and can accept configurable commands. The invention provides core satellite simulation capabilities required for ground station spacecraft command and telemetry processing systems such as OS/COMET or for large-scale simulation networks such as multi-service simulation systems. The present invention offers an inexpensive risk mitigation that relieves application developers of total dependency on the satellite simulation development schedule. Moreover, the present invention can be used to demonstrate the features of ground station application systems. Finally, the present invention training driver can be easier to manage and can be maintained by the training team who can rely upon the knowledge that the training exercises will function properly when presented to a training class.

20 Claims, 3 Drawing Sheets

SATELLITE SIMULATOR

CROSS REFERENCE TO RELATED APPLICATIONS

Not Applicable

STATEMENT REGARDING FEDERALLY SPONSORED RESEARCH OR DEVELOPMENT (Not Applicable)

BACKGROUND OF THE INVENTION

1. Field of the Invention

This invention relates to a demonstration, test and training system, in particular, to a satellite simulator.

2. Description of Related Art

A satellite simulator in accordance with the inventive arrangements provides advantages over all current demonstration, test and training systems now used. The system provides a novel and nonobvious satellite simulator which is useful as an aid in the test and development of spacecraft command and telemetry software applications and systems for ground stations. Current software applications are available which consist of tools and software components useful in the creation of spacecraft command and telemetry applications for ground stations. For example, Software Technology, Inc. of Melbourne, Fla. has developed and offers for commercial sale a commercial off-the-shelf [COTS] product known as Open Systems COMET, or "OS/COMET®".

OS/COMET consists of tools and software components useful in the creation of spacecraft command and telemetry applications for ground stations. Because every satellite ground station application is unique, applications such as OS/COMET are designed with an architecture that accommodates tailoring the basic core system to meet mission-specific requirements. For example these systems may be modified or customized to provide for various satellite orbit types, satellite mission profiles, constellation configurations, communications protocols, and message formats, of a wide variety of systems. The core functionality provided by satellite ground station applications, such as OS/COMET or large-scale simulation networks such as the United States Department of Defense's multi-service simulation systems, is normally supplemented by additional COTS products and custom application modules, typically tied to the core system modules through standard network bus interfaces.

Application engineers building systems based on either OS/COMET type standardized software components or other custom developed systems applications for ground stations often need a test bed to evaluate their ground system development applications. Such test beds arise in several different forms but generally are designed to appear to the ground station software under development as a functioning satellite having the basic communications characteristics anticipated for the fully implemented hardware. In this regard, such test bed systems can be viewed as satellite simulators in that they simulate the outward functionality of an actual satellite for a particular system. Typically, such satellite simulators include software modules to generate appropriate communications and telemetry streams and to receive commands in the same manner as the fully implemented satellite would for the particular satellite or group of satellites.

There are several problems with the currently existing approaches to developing satellite simulators. One problem is that conventional satellite simulator systems have traditionally been custom designed and developed for each ground station application and therefore tend to be both costly and prone to their own development issues. Further, while major development programs may invest considerable resources in high-fidelity satellite simulators, application software developers may not always need the full functionality of such products. Also, high fidelity satellite simulators may have development cycles that leave application developers without suitable test harnesses at critical points early in the application software development cycle. These issues suggest a phased implementation approach to the satellite simulator test bed for each particular application. However, the phased approach creates further development issues. In particular, at the early stages of the ground station development cycle, only rudimentary testing may be required such that the test bed may be constructed to operate on a single host computer platform. However, as the ground station development cycle continues, so does the need for a simulator offering a higher degree of fidelity. This normally requires additional development effort, and sometimes entirely new software and hardware to implement the higher fidelity simulator. For example, the host computer on which the more basic simulator was installed may not offer suitable processing power to implement a higher fidelity simulator. Consequently a more powerful host may be required over time. In this regard, it is often the case with very high fidelity simulators that the processing power necessary cannot practically be provided on a single host computer, unless expensive mainframe computers are used.

Finally, even the use of a standardized ground station system such as OS/COMET requires a comprehensive user training program. In this regard, high-fidelity satellite simulators often need be designed with the fidelity and complexity needed for full mission rehearsals and mission time fault isolation and resolution and so on. Such complexity may make adaptation to more basic training programs difficult. Accordingly, there exists a need for a satellite simulator that is easy to manage and is maintainable by its users, so that a working system can be used with confidence when presenting a training exercise to a class, or in various test scenarios.

SUMMARY OF THE INVENTION

The present invention is a satellite simulator to aid in the development and test of a spacecraft command and telemetry application for ground stations. The present invention was conceived as a tool to permit a satellite simulator to be implemented effectively via a phased approach with scalability to successfully test ground station software at less cost than has traditionally been possible with customized simulator systems. The present invention provides core satellite simulation capabilities required for ground station spacecraft command and telemetry processing systems with the added benefits of scalability, phased implementation and distributed processing. The system permits the simulator to develop from a relatively crude simulation to a relatively high fidelity simulation over a period of time. The distributed architecture allows core elements of the simulator to remain unchanged on a host computer while additional elements are added or modified in a distributed processing environment. These capabilities and others are enabled by means of a distributed messaging system and configurable application specific command input module and telemetry output modules.

The present invention provides core satellite simulation capabilities required for testing ground station processing systems. These capabilities are in several specific areas:

concepts analysis and verification, requirements analysis, development testing, mission rehearsals, on-orbit anomaly isolation and resolution, system testing, product marketing demonstrations, and user training. The present invention offers an inexpensive risk mitigation that relieves application developers of total dependency on the satellite simulation development schedule. Moreover, the present invention can be used to demonstrate the features of ground station application systems. Finally, the present invention can be easier to manage and can be maintained by the training team who can rely upon the knowledge that the training exercises will function properly when presented to a training class. From the spacecraft command and telemetry processing system, the present invention appears as a satellite that can provide a configurable telemetry stream and can accept configurable commands.

One common element of demonstration, test, and training systems is a necessity for the flexibility both to have automated, repeatable scenarios and to respond to ad hoc operator initiated directives. This is particularly important in the control of telemetry streams. Thus, the present invention provides both a scripted scenario capability and a direct operator command interface.

The present invention can concurrently generate a number of data streams updating various spacecraft measurands, in arbitrary combinations, and multiplex the values to generate a composite telemetry stream in a manner which mimics actual spacecraft operation. The rate at which the measurands are updated and the output rate of the composite telemetry streams can be separately controlled. Moreover, the present invention can generate multiple concurrent telemetry streams.

In one embodiment, the invention concerns a satellite simulator adapted for use with a plurality of satellite ground stations. The system preferably includes an application specific telemetry output module configurable for data transmission to any one of a plurality of satellite ground station data acquisition systems; an application specific command input module configurable for receiving data from any one of a plurality of satellite ground station data transmission systems; and a distributed messaging system for providing communications among the various modules comprising the simulator. The distributed messaging system is configured for providing communications between the satellite simulator modules installed on either a single host or distributed on multiple host computers. In particular, the distributed messaging system can utilize CORBA, DCOM, an OS/COMET Software Bus, or any other suitable mechanism for distributing objects and applications across multiple host computers.

A bi-directional communications channel can be provided between any one of the plurality of satellite ground stations and the satellite simulator for enabling passage of uplink command streams and downlink telemetry streams. The satellite simulator adapted for use with a plurality of satellite ground stations further comprises a command sequencer module responsive to the application specific input module. The application specific command input module can be further configurable for enabling communications between any one of the plurality of satellite ground station data transmission systems and the command sequencer module.

The command sequencer module includes a plurality of predetermined user-defined commands; a plurality of predetermined user-defined actions; and, means for associating the plurality of predetermined user-defined commands with the plurality of predetermined user-defined actions.

Specifically, the associating means can comprise a database containing the plurality of predetermined user-defined commands and the plurality of predetermined user-defined actions.

The satellite simulator can further comprise a telemetry data stream formatter module, the application specific telemetry output module being responsive to the telemetry data stream formatter module; and, the application specific telemetry output module being further configurable for enabling communications between the telemetry data stream formatter module and any one of the plurality of satellite ground station data acquisition systems. The satellite simulator can also include a telemetry data stream generator linked to a user interface; the telemetry data stream formatter module being responsive to the telemetry data stream generator. The telemetry data stream generator can include a plurality of user-controlled and user-defined data generation sources; and, is configured for permitting selection of a data generating function from the plurality of user-controlled and user-defined data generation sources. The telemetry stream formatter module can further include a user-defined commutation table for describing proper multiplexing of individual measurands in a telemetry stream, whereby the user-defined commutation table corresponds to a ground station application system decommutation table used for properly extracting the properly multiplexed individual measurands in the telemetry stream.

The satellite simulator can also include a scripting language; and a processor for interpreting and executing directives of the scripting language. Furthermore, the telemetry data stream generator can comprise an external application specific telemetry data generator module for interfacing with an external telemetry data source. Similarly, the command sequencer module can further include an external application specific command processing module for transmitting commands to the external telemetry data source.

A method is also provided for generating telemetry streams. The method can comprise the steps of generating a continuous stream of state of health data from a user-controlled user-defined source; assembling the state of health data into an output telemetry stream; and, ensuring the synchronization of critical measurands contained in the state of health data with the output telemetry stream. Specifically, the assembling step can further comprise multiplexing the state of health data into a composite telemetry stream or into multiple concurrent composite telemetry streams. Moreover, the assembling step can include merging high volume data, like mission data, for example telecommunications streams or images, and on-board computer memory dumps, with the state of health data; and, multiplexing the merged data into an output telemetry stream.

In an alternative embodiment, the satellite simulator is adapted for use with a plurality of satellite ground stations and is comprised of a distributed messaging system for providing communications among a plurality of separate functional modules comprising the simulator. The distributed messaging system is configured for providing communication between the modules installed on both a single host and multiple host computers. A telemetry stream generator module is provided for selectively generating a telemetry data stream. Further, a telemetry data stream formatter is provided for receiving the telemetry data stream from the telemetry data stream generator. The telemetry data stream formatter further comprises an output interface for providing the telemetry data stream to an application specific telemetry output module in a predetermined format. Finally, a command sequencer module is provided which includes a plurality of predetermined user commands, a plurality of user defined action actions, and linking means for associating the plurality of predetermined user defined commands with the plurality of predetermined user defined actions. The command sequencer module further includes input interface means for receiving command data in a predefined format from an application specific input module.

DETAILED DESCRIPTION OF THE PREFERRED EMBODIMENTS

Figure 1:
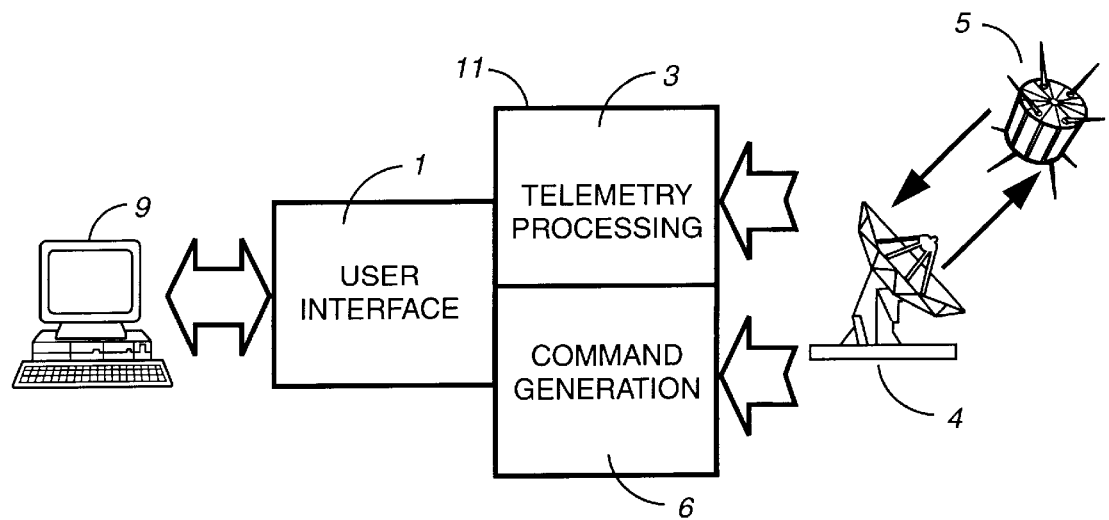
FIG. 1 illustrates the critical elements of a typical ground station application system.

The presently preferred embodiment of the inventive arrangement is shown in the drawings, it being understood, however, that the inventive arrangements are not limited to the precise arrangement and instrumentality shown. FIG. 1 illustrates key elements of a typical spacecraft command and telemetry application for a ground station. In FIG. 1, the configuration reflects an architecture of a ground station having a ground station application system 11. The ground station application system shown is merely shown by way of example, it being understood that the satellite simulator as herein described can be used with any ground station command and telemetry application.

As shown in FIG. 1, the ground station application system 11 receives telemetry via an RF link between satellite 5 and an earth terminal 4. A telemetry processing module 3 is provided for extracting telemetry data received from the satellite 5. The ground station application system 11 processes the telemetry data received in the telemetry processing module 3 and passes any results for display to the graphical user interface 1. The graphical user interface 1 can also receive commands from an operator 9. Satellite commands can be transmitted from the ground station application system 11 through the command generation module 6 to a satellite 5 via earth terminal 4. The ground station application system 11 typically has the capability to archive, record and log data received and transmitted from satellite 5.

Figure 2:
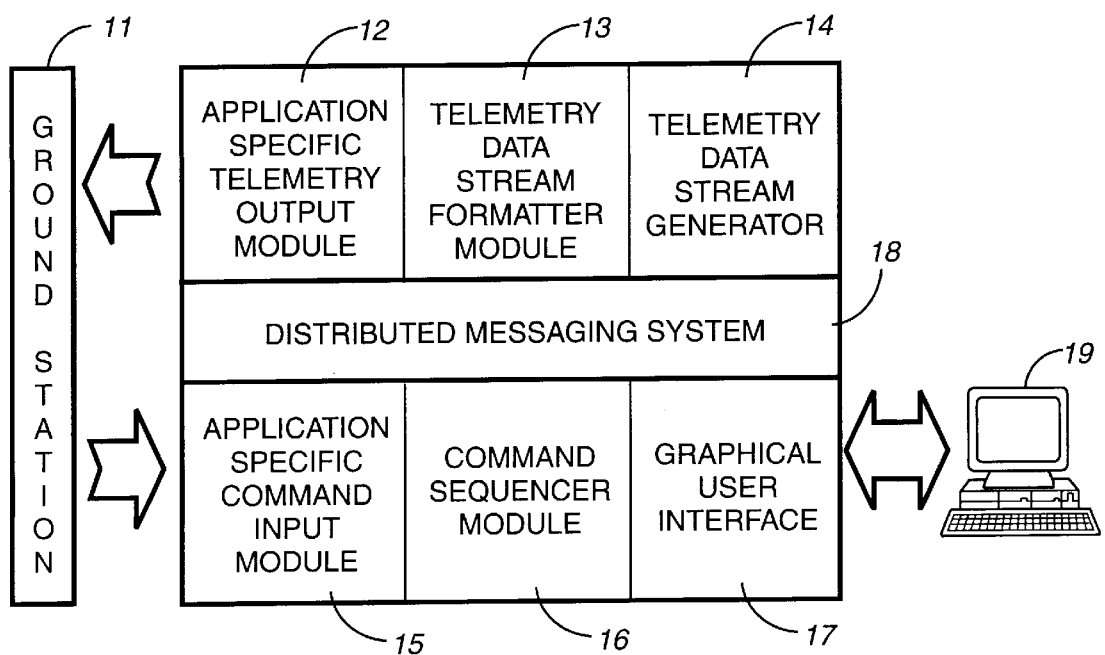
FIG. 2 is a block diagram of the primary modules of the present invention.

FIG. 2 illustrates the key elements of the present invention. The system 21 comprises a plurality of software modules, linked together by a distributed messaging system 18. As shown in FIG. 2, the modules include a telemetry data stream generator 14, a telemetry data stream formatter module 13, and an application specific telemetry output module 12. In addition, there is provided an application specific command input module 15, a command sequencer module 16, and a graphical user interface module 17.

The telemetry data stream generator module 14 is the source module for generating continuous streams of measurand data values. The telemetry data stream generator 14 preferably employs several user controlled, user-defined sources, among which are included fixed values, predefined data generator functions, data extracted from data files, spacecraft parameters submitted by an external program or an external function provided the user. The measurand data produced by the telemetry data stream generator module 14 is intended to replicate one or more instrument readings on board a satellite in real time.

Figure 5:
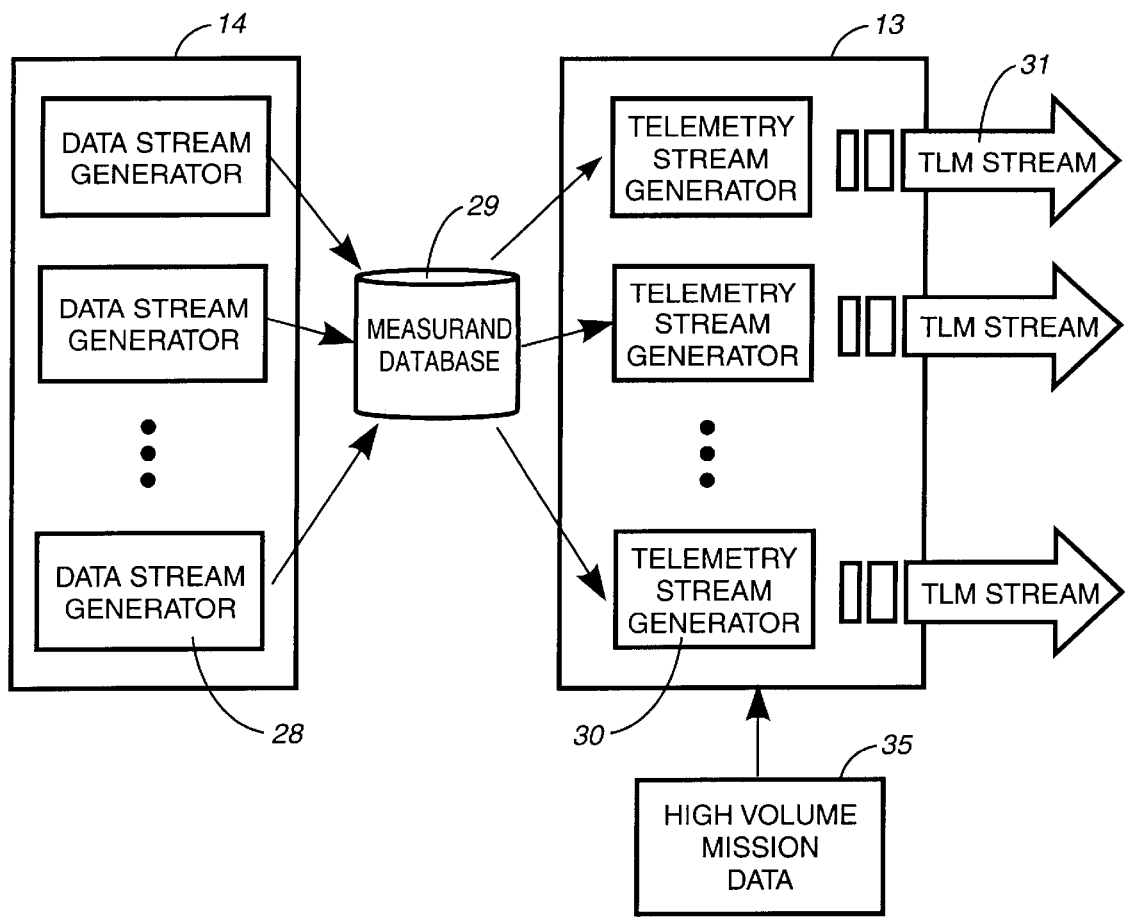
FIG. 5 illustrates the telemetry stream generation process.

Referring to FIG. 5, the several user defined sources contained within the telemetry data stream generator module 14 are illustrated as sub-modules 28, each configured for providing a particular type of data source. Each such sub-module may be thought of as generating data normally associated with a particular spacecraft sensor such as temperature, attitude, power levels and so on. Significantly, it should be noted that while each data stream generator sub-module 28 is shown as residing within the module 14, such modules are preferably distributed among more than one host computer, each communicating with the other modules by means of the distributed messaging system 18. Thus, additional host processors may advantageously be used for one or more of the sub-modules 28 as needed to create a higher fidelity simulator generating real time simulation data as needed.

As shown in FIG. 5, an arbitrary number of simultaneous data stream generator sub-modules 28 can be provided, limited only by hardware constraints, with each sub-module 28 updating one or more measurands. Accordingly, the telemetry data stream generator 14 can generate multiple concurrent telemetry streams 31 up to the maximum concurrent telemetry streams supported by a ground station telemetry process. The telemetry streams are preferably selectable and controllable via a user interface 17. Accordingly, spacecraft anomalies and variations in operating parameters can be controlled or varied as desired by a user.

To provide the needed versatility in generated telemetry streams 31, five mechanisms are preferably provided for measurand data stream generation. Each data stream defines a sequence of values that an individual measurand may take: (1) constant values individually set by the scenario script or the operator through the user interface, by which the measurands would remain unchanged until replaced by another constant value or until attached to an automated stream from another generator source; (2) a set of built-in data pattern functions, for instance sine wave, ramp and step functions, with suitable parameters to control the characteristics of the data pattern, for example sine wave amplitude and sine wave frequency; (3) the ability to extract data from a file, for example recorded telemetry values from an actual spacecraft or a digitized video image, with suitable parameters, to control the extraction rate, and to specify measurand format, for example bits or bytes per value; (4) automatically generated and updated spacecraft position and attitude information from a suitable COTS flight dynamics product, such as the SATELLITE TOOL KIT® (available from Analytic Graphics, Inc.), with suitable parameters to specify such characteristics as the update frequency, parameters desired; and (5) an external function, for instance a user provided satellite system simulator. Thus, this capability permits the present invention to provide telemetry interfaces to more comprehensive spacecraft simulations or complicated data functions.

The data streams from module 14 are provided to the distributed messaging system 18 as shown in FIG. 2. In a preferred embodiment of the invention shown in FIG. 5, the distributed messaging system can be implemented in a manner which is similar to the OS/COMET Software Bus. In that case, the generated simulation data or measurand values are written to a measurand database 29. Subsequently, the data written to measurand database 29 are read by the data stream formatter module 13 as shown. Significantly, however, it should be noted that the invention is not limited in this regard and any other suitable distributed messaging system may also be used in place of the software bus 18. For example, well known local area network interfaces such as CORBA or DCOM may also be used for this purpose.

In FIG. 5, the telemetry stream generator sub-modules 28 are shown which form the telemetry data stream formatter module 13. One or more of these sub-modules are preferably installed and will execute on additional host computers as may be necessary to provide sufficient distributed processing to achieve real time telemetry stream formatting. Multiple telemetry stream generator sub-modules 30 are provided so that a plurality of concurrently operating telemetry downlinks can be simulated as shown. A plurality of telemetry stream channels are provided in this manner to permit simulation of satellite systems in which more than one telemetry downlink channel is anticipated.

Data from the measurand database 29 is typical of what is often referred to as "state of health" data in a real satellite as it reflects the spacecraft's operational conditions and status. This state of health data coming from a satellite is generally a relatively low volume of data. In addition, a real satellite will often provide mission data to a ground station in the form of telecommunications streams, images or on-board computer memory dumps. Such mission data generated in an real satellite is usually of high volume and is often multiplexed with low volume data so as to form a single telemetry stream transmitted by the satellite.

In order to simulate the combination of high and low volume data which is commonly generated by a real satellite, the telemetry data stream generator sub-modules 30 implement a two-stage multiplexing function in order to combine on one telemetry channel the measurand data that is received from the measurand database 29 with high volume mission data provided by high volume mission data module 35. The multiplexing operation is preferably a time slice multiplexing function, but any other suitable multiplexing approach may also be used. The first stage of the multiplexing operation commutates into a telemetry stream patterns of critical and noncritical data from the measurand database 29. To this first stage, a second stage of high volume mission data from module 35 is added. Such high volume mission data, such as telecommunications streams, images or on-board computer memory dumps are either synthesized in module 35 or provided from stored data files. By multiplexing the data in the manner described it is possible to create a telemetry output from the simulator that is more representative of the manner in which actual satellites handle low and high volume data on a shared data link. A commutation database is preferably used to specify the telemetry stream commutation patterns. A decommutation database is preferably provided on a ground station receiving end for de-commutating the data.

In a real satellite, certain types of measurand data may be generated in the form of an analog signal which is sampled periodically so that the current value can be digitally transmitted to a ground station as part of the state of health information for the satellite. Thus, in order to most accurately simulate a telemetry stream generated by a real satellite, it is desirable to also provide a sampled set of the simulated measurand data. In the simulator according to the present invention, this simulation of sampled data is provided in a manner which shall now be described.

The telemetry data stream generator 14 according to a preferred embodiment of the invention is designed with the capability to asynchronously generate measurands. As a result of the commutation process previously described in relation to the present invention, some measurand values stored in the measurand database 29 are inevitably excluded from the telemetry stream. Thus, the present invention more accurately simulates the output of a real satellite wherein the telemetry data stream contains a sampled subset of the measurand data. The subset of the measurand data which is incorporated into the telemetry stream is controllable by varying the commutation database.

In the case of certain types of critical data, it may be important to avoid any loss of data. In such instances, synchronization is provided between the data streams generated by data stream generator sub-modules 28 and the output telemetry streams generated by the telemetry data stream formatter module 13. Such critical measurands may including UMI files, image data and user-provided "canned" data.

The telemetry data stream formatter module 13 preferably interfaces to the application specific telemetry output module 12 using a standard or predefined interface whose specification allows the user to program the appropriate application specific interface module. In a preferred embodiment, the telemetry data stream formatter module 13 provides its output data stream to the software bus in a manner similar to that described above relative to the telemetry data stream generator 14. In particular, the telemetry data stream is preferably written to a telemetry stream database in a predetermined format so that it may be subsequently accessed by the application specific telemetry output module 12. The application specific telemetry output module 12 preferably retrieves the telemetry data stream from the database and applies appropriate messaging protocols as necessary to interface with a particular ground station application 11, at a particular stage of development.

Thus, for example, the application specific telemetry output module may convert the telemetry data stream to a high fidelity representation of an RF telemetry stream in a form specifically selected for use in connection with a particular ground station 11 or in the alternative may use standard computer network messaging techniques for rudimentary simulation levels. By providing the telemetry output module 12 with an interface that matches the ground station telemetry processing module 3 through corresponding protocol layers, a framework is provided which can extensively exercise the telemetry processing systems of a satellite ground station without the need to actually simulate all of the details of the RF telemetry. In a preferred embodiment, the existing satellite ground station application system 11 is developed or under development using OS/COMET. However, any other ground station development architecture may be used with the present invention so that the ground station and simulator utilize matched interfaces through corresponding protocol layers.

If matched interfaces are used through corresponding protocol layers of both the existing satellite ground station application system 11 and the simulator 21, the application specific telemetry output module 12 may be configured to ignore the various layers of communication protocol normally associated with satellite telemetry downlinks. In such cases, the application specific telemetry output module 12 and the telemetry processing module 3 which is under development for the ground station may instead make use of standard, internally represented telemetry streams to the telemetry processing module 3. Thus, the actual interface between the present invention and the satellite ground station application system 11 may use the OS/COMET software bus 7, System V sockets, an RS-232 or RS-422 serial data link, or any other means, as may be appropriate to the demonstration, test or training configuration. Alternatively, any or all elements of the actual system telemetry protocol may be incorporated into the telemetry processing modules 3 and 12 with appropriate sequencing, error detection, and error correction mechanisms.

The application specific command input module 15 is provided for receiving commands from the command generation module 6 of ground station 11. A particular application specific command input module is required for each ground station to accommodate the particular command format and protocols associated with the ground station 11. The command input module 15 extracts individual commands with the corresponding parameters from the command channel stream and can transmit them to an appropriate module of the simulator 21 for interpretation. Similar to the interface between the telemetry output module 12 and the data acquisition module 3, the command interface can be rudimentary or can be a high fidelity representation of an actual command link as anticipated for a particular satellite system. Accordingly, if matched computer network messaging interfaces are used as described above, the command generation module 6 and the command input module 15 may be configured to ignore the various layers of communication protocol normally associated with satellite telemetry downlinks and instead make use of standard computer network messaging protocols. Once again, the actual interface between the simulator and the satellite ground station system 11 may use the OS/COMET software bus 7, System V sockets, an RS-232 or RS-422 serial data link, or any other means, as may be appropriate to the demonstration, test or training configuration. Alternatively, any or all elements of the actual system command protocol may be incorporated into the modules 6 and 15 with appropriate sequencing, error detection, and error correction mechanisms.

Commands extracted from the command data stream by the command input module 15 are provided to the command sequencer module 16 via the distributed messaging system 18. Thus, in a preferred embodiment utilizing an OS/COMET type software bus, the commands are preferably written to a globally accessible database file by the command input module 15 and subsequently accessed by the command sequencer module 16. However any other distributed messaging system may be used for this purpose as described above.

The command sequencer module preferably provides a predefined response for each command received from the ground station. In a preferred embodiment, predetermined user-defined commands and their corresponding predetermined user-defined responses can be stored in a database, preferably represented by a look-up table. Each command is preferably accepted by the command sequencer in FIFO sequence and appropriate processing is performed. Such processing can include for example a directive to set a constant measurand in the telemetry generation process, or a sequence of operations in a predefined executable behavior script, which, if desired, can invoke external user programs.

Figure 3:
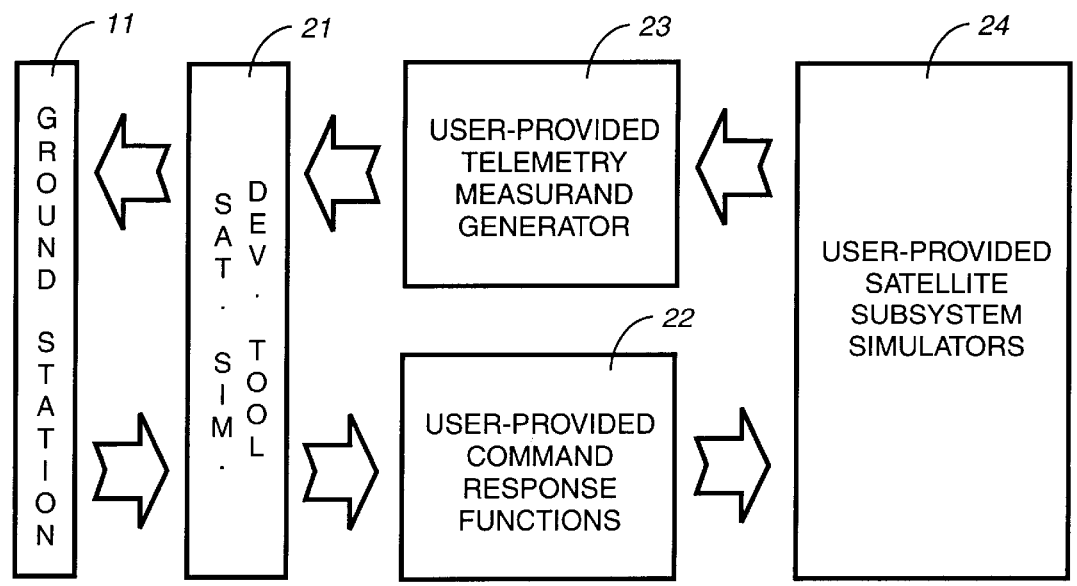
FIG. 3 illustrates the flow of data between the present invention, a ground station application system and an external User-Provided Satellite Subsystem Simulator.

FIG. 3 illustrates how the present invention 21 can interface a spacecraft subsystem simulator 24 to a ground station application system 11. The user can provide the satellite subsystem simulator 24, system-specific routines 23 to pass appropriate measurands to the system telemetry stream generation function, which, in turn, can return system-specific command response functions 22. By making use of an open architecture, the satellite subsystem simulator can be developed on a separate host and can be added to the existing simulator software at such time as the simulator is required to provide a greater degree of simulation fidelity.

Figure 4:
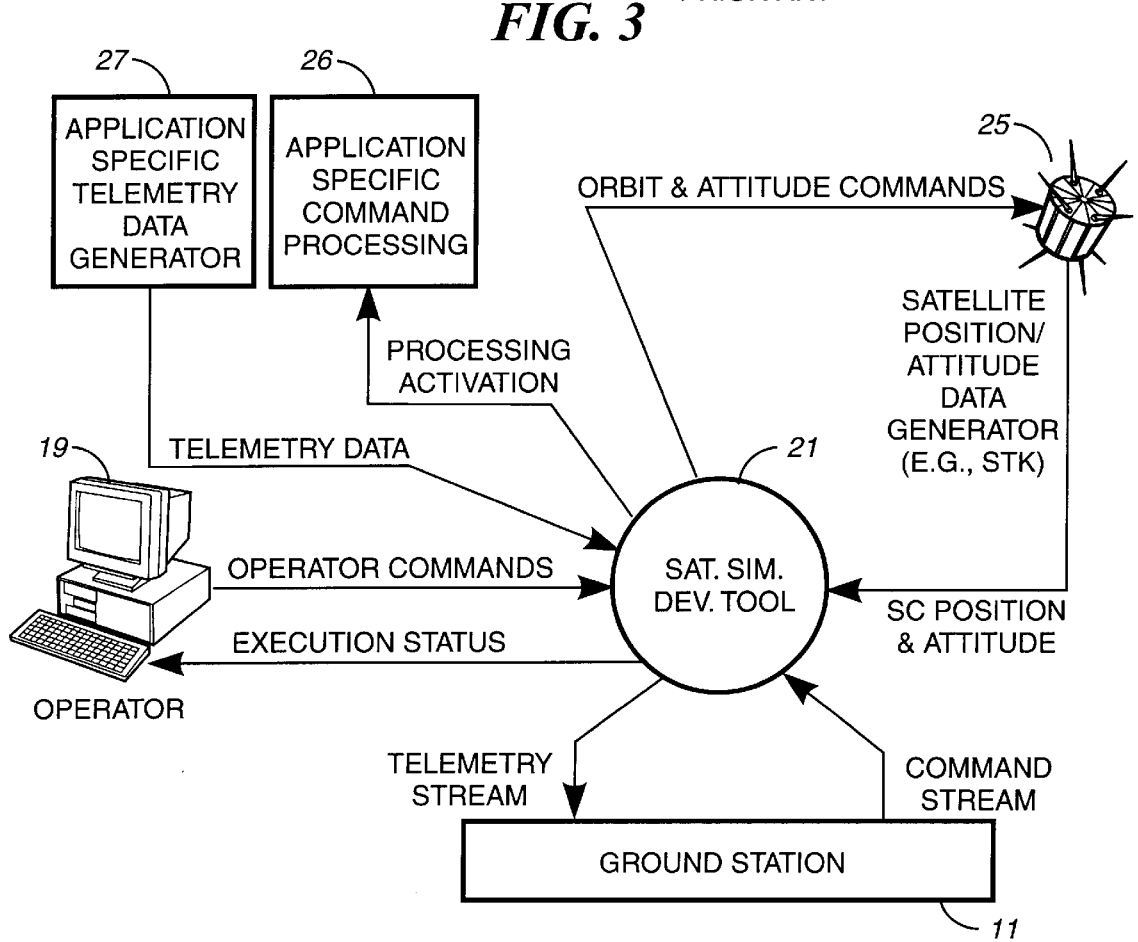
FIG. 4 is an external interface diagram.

FIG. 4 illustrates the present invention's external interface. At its core, the simulator 21 receives command streams from both the operator 19 and the satellite ground station system 11. By coupling uplink commands with changes to the telemetry streams, the present invention 21 can demonstrate or test a wide variety of spacecraft command and telemetry processing system telemetry streams. The simulator 21 can receive telemetry data from an application specific telemetry data generator 27, and can transmit process activation commands to an application specific command processor 26. Moreover, the present invention 21 can receive position and attitude information from an external Satellite Position and Attitude Generator 25, for example Analytical Graphics, Inc.'s "SATELLITE TOOL KIT®". Conversely, the system can issue orbit and attitude commands to the satellite position and attitude generator 25. Hence, by linking commands to application specific functions, the simulator 21 can provide a command interface from a spacecraft command and telemetry processing system ground station simulation to more comprehensive spacecraft simulations. Finally, the present invention 21 can pass telemetry streams to a satellite ground station application system 11 and can transmit the status of execution commands to the operator 19.

Significantly, the present invention can provide a satellite simulation in either a single host computer environment, or in a distributed processing environment where the satellite simulator components are distributed over a number of host computers. This is an important feature as it facilitates the use of additional host processors and applications software as may be necessary to implement a simulation having increasing levels of fidelity in real time. This feature is made possible by using distributed messaging system to permit communications among the simulator modules by means of common local area network interfaces, for instance CORBA or DCOM an OS/COMET software bus. The distributed processing arrangement for the various simulator modules combined with the application specific command input and telemetry output modules allows the simulator great flexibility and scalability as it transitions from a rudimentary simulator to one having substantial fidelity.

We claim:

1. A satellite simulator adapted for use with a plurality of satellite ground stations, said satellite simulator comprising:
    a distributed messaging system for providing communications among a plurality of separate modules comprising said simulator, said distributed messaging system configured for providing communication between said modules installed on both a single host and multiple host computers;
    an application specific telemetry output module configurable for data transmission to any one of a plurality of satellite ground station data acquisition systems;
    an application specific command input module configurable for receiving data from any one of a plurality of satellite ground station data transmission systems; and,
    whereby said satellite simulator can simulate different satellites and satellite constellations for exercising different ones of said plurality of satellite ground stations.

2. The satellite simulator of claim 1, further comprising a bi-directional communications channel between said plurality of satellite ground stations and said satellite simulator for enabling passage of uplink command streams and downlink telemetry streams.

3. The satellite simulator according to claim 2, wherein said bi-directional communications channel is selected from one of the group consisting of an OS/COMET software bus, System V sockets, an RS-232 or RS-422 serial data link.

4. The satellite simulator of claim 1, further comprising:
a command sequencer module responsive to said application specific input module; and,
said application specific command input module being further configurable for enabling communications between said any one of said plurality of satellite ground station data transmission systems and said command sequencer module.

5. The satellite simulator of claim 4, wherein said command sequencer module further comprises:
a plurality of predetermined user-defined commands;
a plurality of predetermined user-defined actions; and,
means for associating said plurality of predetermined user-defined commands with said plurality of predetermined user-defined actions.

6. The satellite simulator of claim 5, wherein said associating means comprises a database containing said plurality of predetermined user-defined commands and said plurality of predetermined user-defined actions.

7. The satellite simulator of claim 1, further comprising:
a telemetry data stream formatter module, said application specific telemetry output module being responsive to said telemetry data stream formatter module; and,
said application specific telemetry output module being further configurable for enabling communications between said telemetry data stream formatter module and said any one of said plurality of satellite ground station data acquisition systems.

8. The satellite simulator of claim 7, further comprising:
a telemetry data stream generator linked to a user interface; and,
said telemetry data stream formatter module being responsive to said telemetry data stream generator.

9. The satellite simulator of claim 8, wherein said telemetry data stream generator further comprises:
a plurality of user-controlled and user-defined data generation sources; and,
means for selecting a data generating function from said plurality of user-controlled and user-defined data generation sources.

10. The satellite simulator of claim 9, wherein said telemetry data stream formatter module further comprises a user-defined commutation table for describing proper multiplexing of individual measurands in a telemetry stream,
whereby said user-defined commutation table corresponds to a ground station application system decommutation table used for properly extracting said properly multiplexed individual measurands in said telemetry stream.

11. The satellite simulator of claim 8, wherein said telemetry data stream generator further comprises an external application specific telemetry data generator module for providing an external telemetry data source.

12. The satellite simulator of claim 11, further comprising an external application specific command processing module for transmitting commands to said external application specific telemetry data generator module.

13. The satellite simulator of claim 1, further comprising:
a scripting language; and,
a processor for interpreting and executing directives of said scripting language.

14. A satellite simulator adapted for use with a plurality of satellite ground stations, said satellite simulator comprising:
a distributed messaging system for providing communications among a plurality of separate functional modules comprising said simulator, said distributed messaging system configured for providing communication between said modules installed on both a single host and multiple host computers;
a telemetry stream generator module for selectively generating a telemetry data stream;
a telemetry data stream formatter for receiving said telemetry data stream from said telemetry data stream generator and further comprising output interface means for providing said telemetry data stream to an application specific telemetry output module in a predetermined format; and
a command sequencer module comprising a plurality of predetermined user commands, a plurality of user defined action actions, and means for associating said plurality of predetermined user defined commands with said plurality of predetermined user defined actions, said command sequencer module further comprising input interface means for receiving command data in a predefined format from an application specific input module;
whereby said satellite simulator can simulate different satellites and satellite constellations for exercising different ones of said plurality of satellite ground stations.

15. A method for providing a phased implementation of a satellite simulator for use with a ground station application development program, said method comprising the steps of:
developing a ground station application comprising at least one of a telemetry processing application system and a command generation application system;
concurrently developing at least one of an application specific telemetry output module and an application specific command input module for said satellite simulator, said application specific telemetry output module and command input module each configured for communication with said ground station utilizing a computer network messaging system;
operating said satellite simulator to test said ground station application.

16. The method according to claim 15 wherein said computer network messaging system is selected from the group consisting of an OS/COMET software bus, System V sockets, an RS-232 or RS-422 serial data link.

17. The method according to claim 15 further comprising the step of modifying said application specific telemetry output module and said application specific command input module as said ground station application is developed to more closely simulate a pre-defined RF telemetry link designated for providing actual communications between said ground station application and an actual satellite to be used therewith.

18. The method according to claim 17 wherein said satellite simulator further comprises a distributed messaging system, a telemetry stream generator and a command sequencer module.

19. The method according to claim 18 further comprising the step of implementing at least one sub-module comprising said telemetry stream generator on a host computer separate from at least one of said application specific telemetry output module and said application specific command input module.

20. The method according to claim 17 further comprising the step of implementing at least one sub-module comprising said command sequencer module on a host computer separate from at least one of said application specific telemetry output module and said application specific command input module.

* * * * *